(12) United States Patent
Kometani et al.

(10) Patent No.: US 8,020,874 B2
(45) Date of Patent: Sep. 20, 2011

(54) ROTATING WHEEL MECHANISM OF CONSTRUCTION MACHINE AND DRIVE WHEEL MECHANISM OF CONSTRUCTION MACHINE

(75) Inventors: Yukio Kometani, Osaka (JP); Junichi Matsui, Osaka (JP)

(73) Assignee: Komatsu Ltd., Tokyo (JP)

( * ) Notice: Subject to any disclaimer, the term of this patent is extended or adjusted under 35 U.S.C. 154(b) by 640 days.

(21) Appl. No.: 12/093,432

(22) PCT Filed: Nov. 14, 2006

(86) PCT No.: PCT/JP2006/322602
§ 371 (c)(1),
(2), (4) Date: May 12, 2008

(87) PCT Pub. No.: WO2007/055365
PCT Pub. Date: May 18, 2007

(65) Prior Publication Data
US 2009/0085303 A1    Apr. 2, 2009

(30) Foreign Application Priority Data
Nov. 14, 2005    (JP) ................................. 2005-329333

(51) Int. Cl.
*F16J 15/44* (2006.01)
*F16C 33/76* (2006.01)
*F16C 33/80* (2006.01)

(52) U.S. Cl. ......... 277/348; 277/423; 384/478; 384/480

(58) Field of Classification Search .................. 277/419, 277/423, 424, 348; 384/480, 478
See application file for complete search history.

(56) References Cited

U.S. PATENT DOCUMENTS

| | | | | |
|---|---|---|---|---|
| 2,063,738 A | * | 12/1936 | Hedgcock | 384/558 |
| 2,071,947 A | * | 2/1937 | Oelkers et al. | 384/459 |
| 2,443,982 A | * | 6/1948 | Gurley | 277/385 |
| 2,478,649 A | * | 8/1949 | Wightman | 277/424 |
| 3,272,519 A | * | 9/1966 | Voitik | 277/380 |
| 3,279,804 A | * | 10/1966 | Blair | 277/380 |
| 3,510,138 A | * | 5/1970 | Bowen et al. | 277/571 |
| 3,712,756 A | * | 1/1973 | Kalikow et al. | 415/175 |
| 4,277,114 A | * | 7/1981 | Lindegger | 384/144 |
| 4,465,285 A | * | 8/1984 | Toyoda et al. | 277/377 |
| 4,482,194 A | * | 11/1984 | Chambers, Sr. | 384/480 |
| 4,488,729 A | * | 12/1984 | Story et al. | 277/408 |

(Continued)

FOREIGN PATENT DOCUMENTS
JP    60-43772    3/1985
(Continued)

*Primary Examiner* — Alison Pickard
(74) *Attorney, Agent, or Firm* — Fox Rothschild LLP

(57) ABSTRACT

A floating seal is provided between the fixed housing and the drive wheel, and an outside seal is provided so as to cover the outer circumference of the floating seal. The outside seal is composed of a gap between the fixed seal member secured to the fixed housing serving as a vehicle body and the rotating seal member rotatably secured integrally with the drive wheel. Blades that rotate on the outer circumference of the outside seal are provided on the outer circumference of the rotating seal member so as to protrude therefrom. By means of the blades, dirt accumulated in the fixed housing is scraped off. Therefore, dirt is prevented from being accumulated on the outer circumference of the outside seal, wherein it is possible to prevent dirt from entering the position of the floating seal and to appropriately discharge the dirt that has entered to the outside.

7 Claims, 16 Drawing Sheets

U.S. PATENT DOCUMENTS

| | | | | |
|---|---|---|---|---|
| 4,613,005 | A | * | 9/1986 | Olsson .......................... 175/371 |
| 4,721,312 | A | * | 1/1988 | Hornberger ................... 277/349 |
| 4,817,846 | A | * | 4/1989 | Eichinger ..................... 277/370 |
| 4,913,450 | A | * | 4/1990 | Asberg .......................... 277/346 |
| 4,925,366 | A | * | 5/1990 | Dorski ....................... 415/174.3 |
| 5,074,408 | A | * | 12/1991 | Smith et al. ................... 198/842 |
| 5,188,214 | A | * | 2/1993 | Uttke et al. ................... 198/501 |
| 5,538,258 | A | * | 7/1996 | Hager et al. .................. 277/423 |
| 5,636,848 | A | * | 6/1997 | Hager et al. .................. 277/420 |
| 5,951,020 | A | * | 9/1999 | Orlowski ...................... 277/419 |
| 6,113,106 | A | * | 9/2000 | Dahlheimer ................. 277/433 |
| 6,168,163 | B1 | * | 1/2001 | Thorson et al. ............... 277/419 |
| 7,311,448 | B2 | * | 12/2007 | Engel et al. ................... 384/484 |
| 7,530,870 | B2 | * | 5/2009 | Kishimoto et al. ........... 440/112 |
| 2004/0028305 | A1 | * | 2/2004 | Akagami et al. .............. 384/477 |
| 2010/0052265 | A1 | * | 3/2010 | Hartmann et al. ............ 277/424 |

FOREIGN PATENT DOCUMENTS

| | | |
|---|---|---|
| JP | 5-90051 | 12/1993 |
| JP | 08-020368 | 1/1996 |
| JP | 2000-346205 | 12/2000 |
| JP | 2002-206647 | 7/2002 |

\* cited by examiner

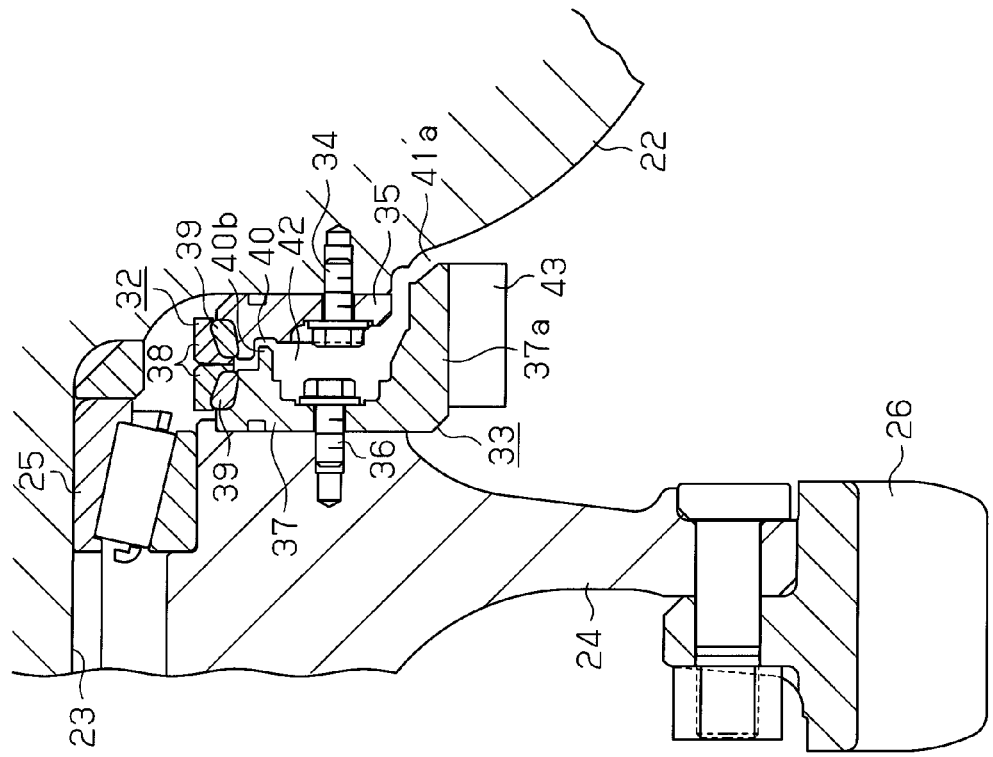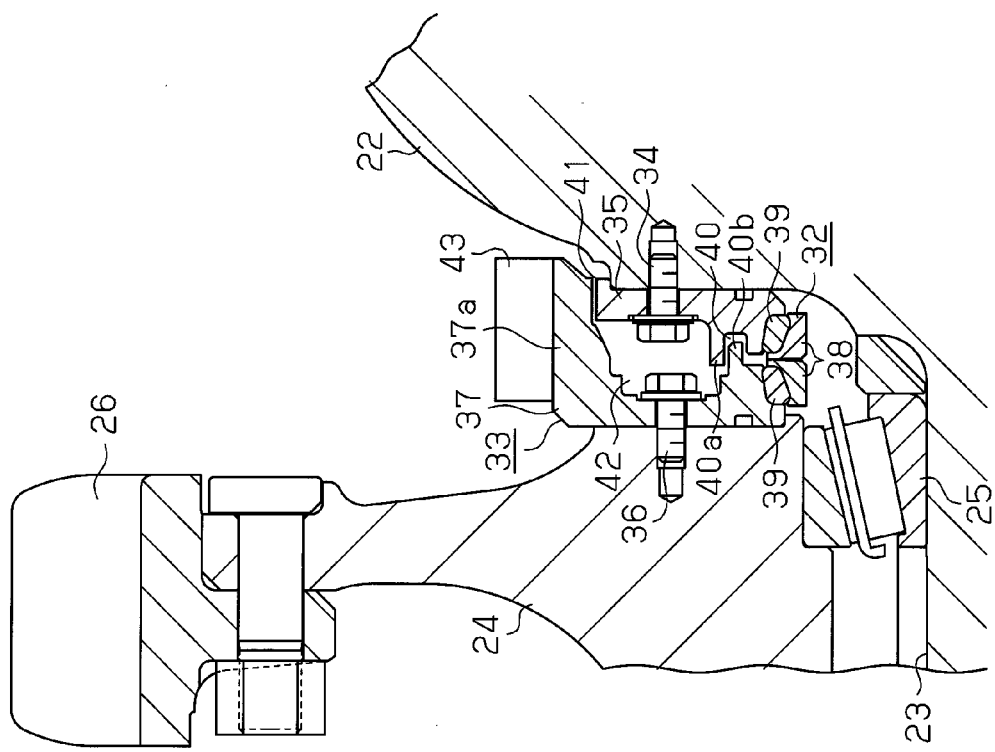

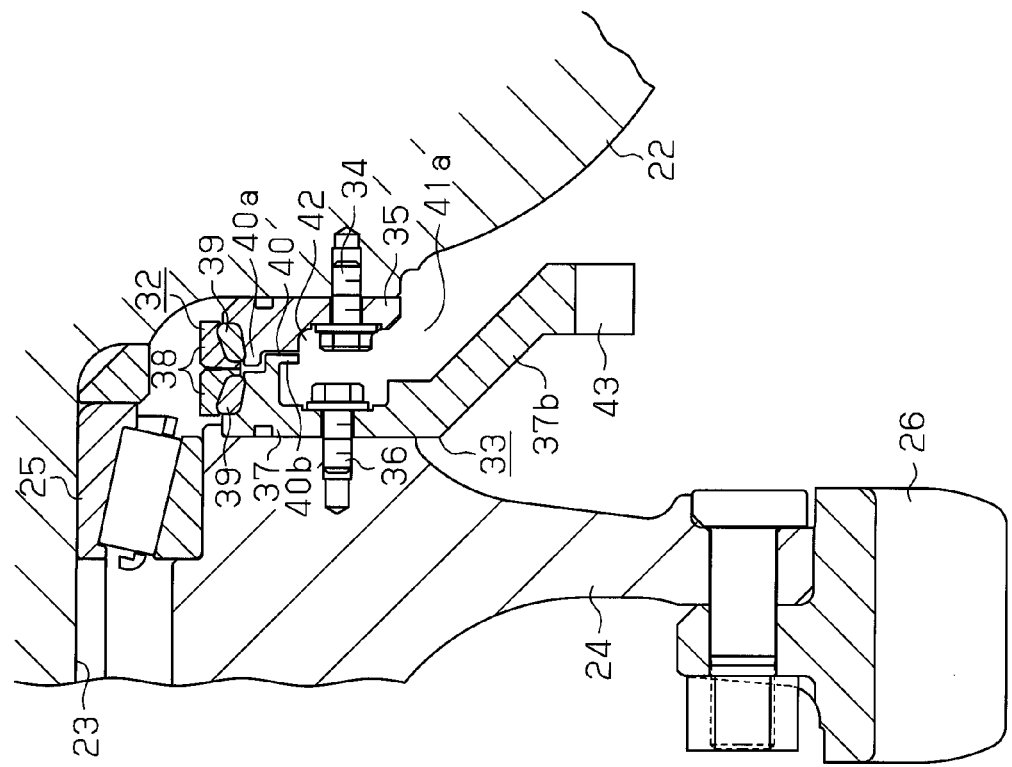
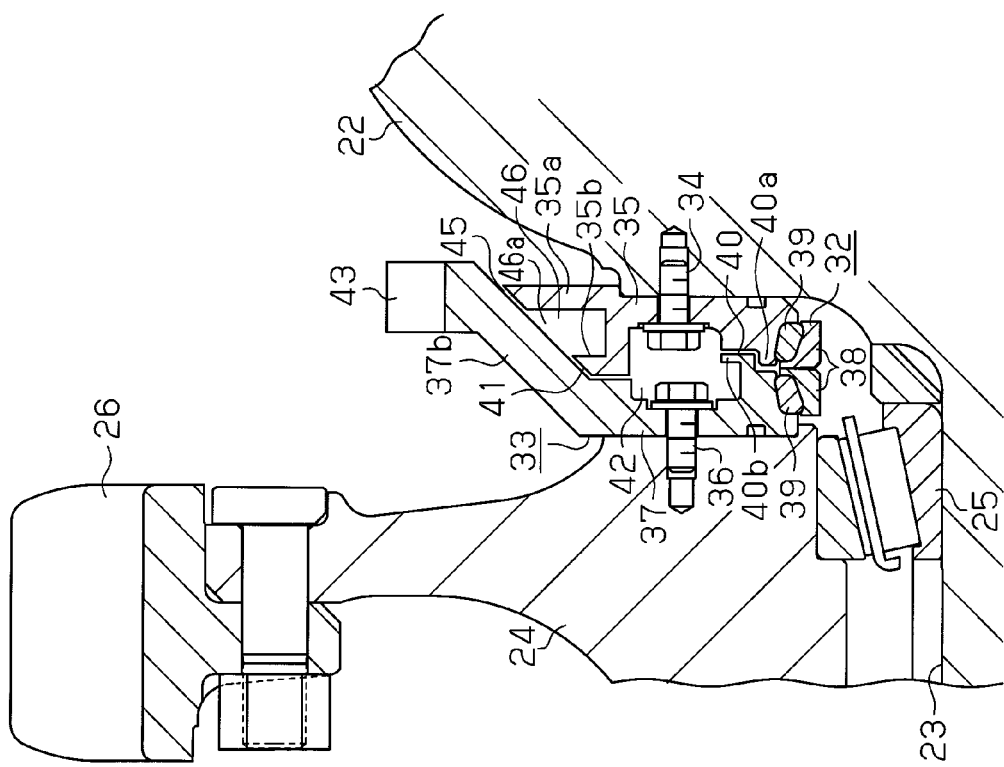

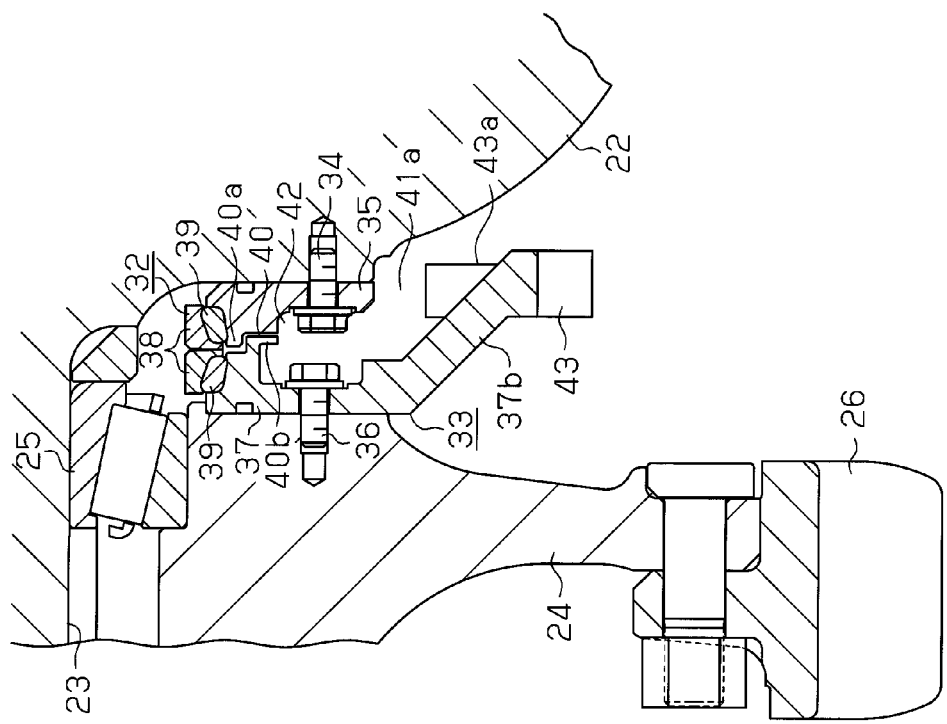
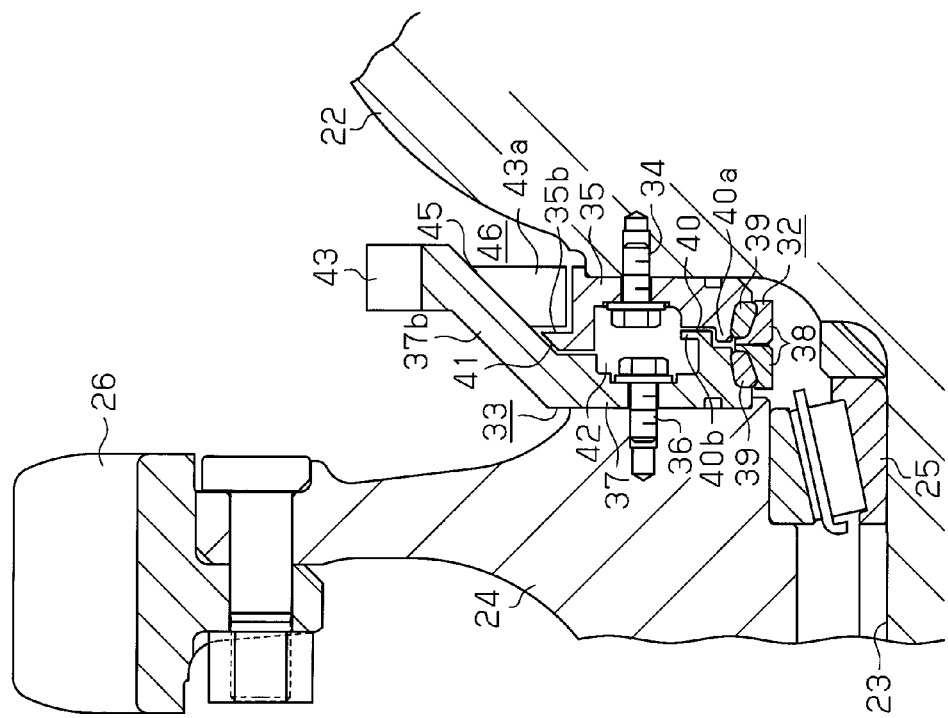

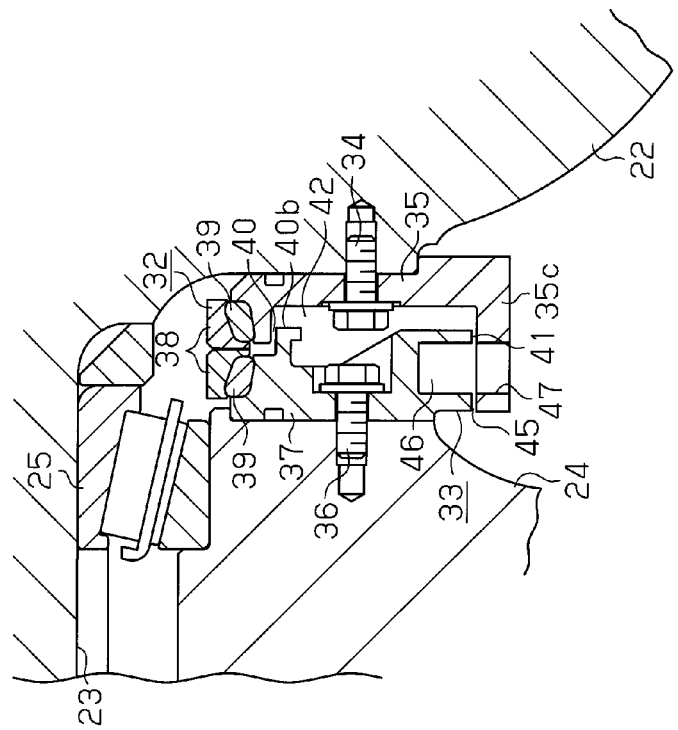
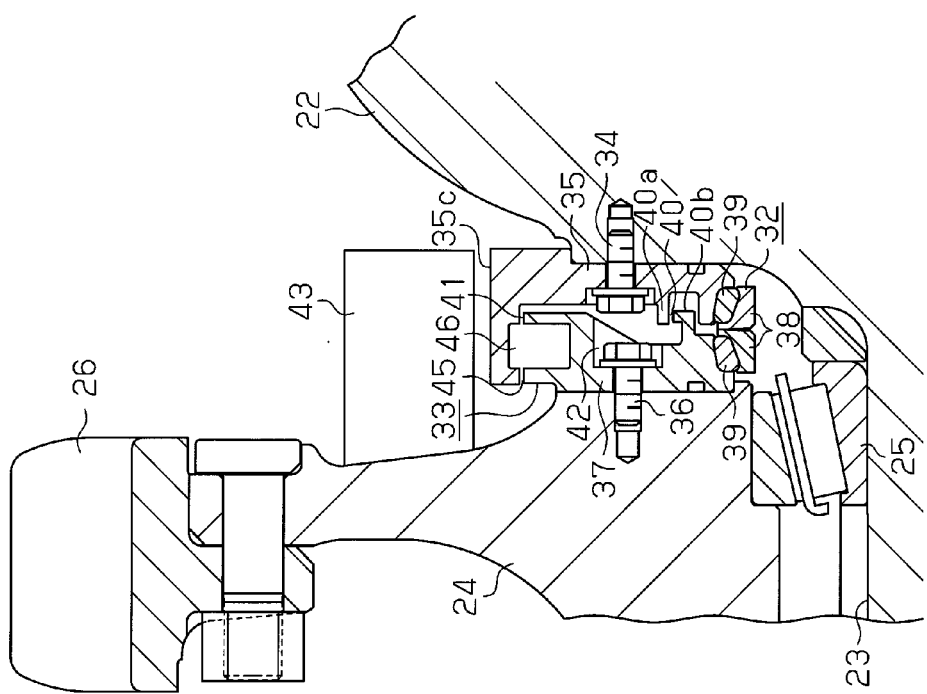

ROTATING WHEEL MECHANISM OF CONSTRUCTION MACHINE AND DRIVE WHEEL MECHANISM OF CONSTRUCTION MACHINE

FIELD OF THE INVENTION

The present invention relates to a rotating wheel mechanism such as a drive wheel, an idler tumbler, a roller, etc., in construction machines such as a bulldozer, etc., in particular to a sealing structure of the rotating wheel mechanism, and further to a sealing structure of a drive wheel mechanism.

BACKGROUND OF THE INVENTION

FIGS. 25 and 26 show one example of a conventional sealing structure in a rotating wheel mechanism of this type of construction machines. FIG. 25 shows the upper part of the sealing structure, and FIG. 26 shows the lower part thereof. In the rotating wheel mechanism, a floating seal 101 composed of a ring at the fixed side and a ring at the rotating side, which are fitted to each other, is provided in order to prevent lubricant oil for a bearing 100 from leaking, and to prevent dirt and dust from entering. Also, a fixed seal member 103 is secured to the vehicle body 102 on the outer circumference of the floating seal 101, and a rotating seal member 105 is provided at the rotating wheel 104. An inner circumferential gap seal 106 and an outer circumferential gap seal 107 are provided between these seal members 103 and 105. Further, a space 108 positioned between the inner circumferential gap seal 106 and the outer circumferential gap seal 107 is formed between the seal members 103 and 105. As shown in FIG. 26, at the outer circumferential gap seal 107 and the space 108, the lower part of a circumferential area about the center of rotation of the rotating wheel 104 is opened downward.

The outer circumference of the floating seal 101 is sealed by the gap seals 106 and 107, dirt is prevented from entering from above the position of the floating seal 101. In addition, dirt that has entered the portion of the floating seal 101 drops and is discharged from the opening at the lower part of the space 108.

However, as shown by double dotted chain lines in FIGS. 25 and 26, dirt D is apt to be adhered to and accumulated on the vehicle body 102 and the rotating wheel 104 in a state where dirt D encloses the seal members 103 and 105. In particular, if soil at a work site is, for example, clay, a great deal of dirt D is apt to be thickly accumulated. Therefore, there is a large possibility that a great deal of the accumulated dirt D will enter the portion of the floating seal 101 through the gap seals 106 and 107. For this reason, there is a problem that the sealing property of the floating seal 101 is lost at an early stage, and the service life of the seal is reduced. In particular, where accumulated substances like clay are dried and solidified, the accumulated substances turn granular or powdery to easily pass through the gap seals 106 and 107 and always drop. This can become a cause for further shortening of the service life of the floating seal 101.

In addition, dropping of dirt from the space 108, etc., is hindered by the accumulated dirt at the lower part of the seal members 103 and 105, and further adverse influences are given to the service life of the floating seal 101.

On the other hand, as the rotating wheel mechanism aiming at the sealing property of the outside seal of the floating seal in this type of construction machines, for example, the rotating wheel mechanisms constructed as disclosed by Patent Documents 1 and 2 have been proposed. That is, in the construction described in Patent Document 1, a notched portion to vary the gap amount is formed on the wall at the rotating wheel, which composes the outside seal consisting of a gap. The pressure of entering dirt is changed by varying the gap amount at the notched portion, wherein the amount of the dirt from the outside can be reduced. Further, in the construction described in Patent Document 2, an annular inclination portion that is gradually enlarged so as to have a large diameter toward the housing is formed on the wall at the rotating wheel, which wall composes the outside seal consisting of a gap. When the rotating wheel rotates, dirt that has entered the interior are discharged outside via the inclination portion of the gap by a centrifugal force.

However, in the prior art constructions according to Patent Documents 1 and 2, no countermeasures are taken against dirt accumulated on the outer circumference of the outside seal. Therefore, it is difficult to remove adverse influences against the floating seal due to the accumulated dirt described above.

Patent Document 1: Japanese Laid-Open Utility Model Publication No. 5-90051
Patent Document 2: Japanese Laid-Open Patent Publication No. 2000-346205

SUMMARY OF THE INVENTION

Accordingly, it is an objective of the present invention to provide a rotating wheel mechanism of construction machines and a drive wheel mechanism thereof, which are capable of preventing dirt from being accumulated at an outer circumferential portion of the outside seal and are capable of improving the effects of preventing dirt from entering the floating seal and the effects of discharging has entered dirt to the outside.

In order to achieve the above-described objectives, a rotating wheel mechanism of construction machines according to a first aspect of the invention includes an annular seal coaxial with the rotating wheel and an outside seal, which encloses the outer circumference of the annular seal, between the vehicle body and the rotating wheel. Blades that rotate in the outer circumferential area of the outside seal are provided at the rotating wheel or a portion rotating integrally with the rotating wheel.

In the rotating wheel mechanism of construction machines according to the first aspect, dirt that is adhered to the outer circumference of the outside seal is scraped off and removed by the blades rotating along the outer circumference of the outside seal when the rotating wheel rotates. Accordingly, since dirt is prevented from being accumulated on the outer circumference of the outside seal, and a concern for dirt entering the floating seal through the outside seal is reduced. Further, since the opening portion is prevented from being clogged due to dirt at the lower part area on the outer circumference of the outside seal, it is possible to smoothly discharge entered dirt toward the outside of the lower part through the opening.

Also, dirt referred to herein includes clay, loam, sandy soil and the equivalents, and substances in which these are dried and solidified.

In accordance with a second aspect, the outside seal is a gap seal composed by causing a gap to intervene between a fixed seal member secured to the vehicle body and the rotating seal member provided on the rotating wheel. The gap seal coaxially includes the inner circumferential seal and the outer circumferential seal opened downward at the lower part of the circumferential area about the center of rotation of the rotating wheel. With such a construction, it is possible to appropriately prevent dirt from entering the portion of the floating seal by means of both of the inner circumferential seal and the outer circumferential seal.

In accordance with a third aspect, the rotating seal member at the outer circumferential seal is positioned at the outer circumference of the fixed seal member, and the blades are provided on the rotating seal member. In the construction, since the rotating seal member is positioned on the outer circumference, dirt is smoothly discharged by the centrifugal force.

In accordance with a fourth aspect, an annular space opened downward at the lower part of the circumferential area about the center of rotation of the rotating wheel is formed between the outer circumferential seal and the inner circumferential seal. With such a construction, dirt is prevented from entering the outside seal by the annular space, and the dirt that has entered the annular space is discharged outside through the lower part of the annular space. Therefore, the effect of preventing dirt from entering the portion of the floating seal is further improved.

In accordance with a fifth aspect, the blades are provided with a first blade protruding toward the outer circumference of the rotating wheel and a second blade protruding toward the center of rotation of the rotating wheel on the inner circumference of the first blade. Therefore, since the blades are rotated in two annular areas, it is possible to effectively prevent dirt from being accumulated.

In accordance with a sixth aspect, the blades have an inclination by which dirt are discharged from the center of rotation of the rotating wheel to the outside as the rotating wheel rotates. With such a construction, dirt is effectively prevented from entering the portion of the floating seal, and the dirt is smoothly discharged.

In accordance with a seventh aspect, an inclination of the blade is provided at the leading side of the rotating wheel in the rotation direction and at the trailing side thereof. With such a construction, even if the rotating wheel rotates forward or in reverse, dirt is effectively prevented from entering, and is effectively discharged.

In accordance with an eighth aspect, the invention is embodied in a drive wheel mechanism of construction machines. Since it is possible to effectively prevent dirt from entering the drive wheel mechanism, the drive wheel is satisfactorily rotated for a prolonged period of time, wherein service life and maintenance cycle thereof can be extended.

BRIEF DESCRIPTION OF THE DRAWINGS

FIG. 2 is an enlarged partial cross-sectional view showing the upper sealing structure of the rotating wheel mechanism of FIG. 1;

FIG. 3 is an enlarged partial cross-sectional view showing the lower sealing structure of the rotating wheel mechanism of FIG. 1;

FIG. 7 is a partial cross-sectional view showing an upper sealing structure of a rotating wheel mechanism according to a second embodiment;

FIG. 8 is a partial cross-sectional view showing the lower sealing structure of the rotating wheel mechanism according to the second embodiment;

FIG. 10 is a cross-sectional view showing the upper sealing structure of a rotating wheel mechanism according to a third embodiment;

FIG. 11 is a partial cross-sectional view showing the lower sealing structure of the rotating wheel mechanism according to the third embodiment;

FIG. 12 is a partial cross-sectional view showing an upper sealing structure of a rotating wheel mechanism according to a fourth embodiment;

FIG. 13 is a partial cross-sectional view showing the lower sealing structure of the rotating wheel mechanism according to the fourth embodiment;

DETAILED DESCRIPTION OF THE PREFERRED EMBODIMENTS

First Embodiment

A crawler track drive wheel mechanism according to a first embodiment of the present invention will now be described with reference to FIGS. 1 to 6. The crawler track is used in a construction machine such as a bulldozer.

Figure 1:
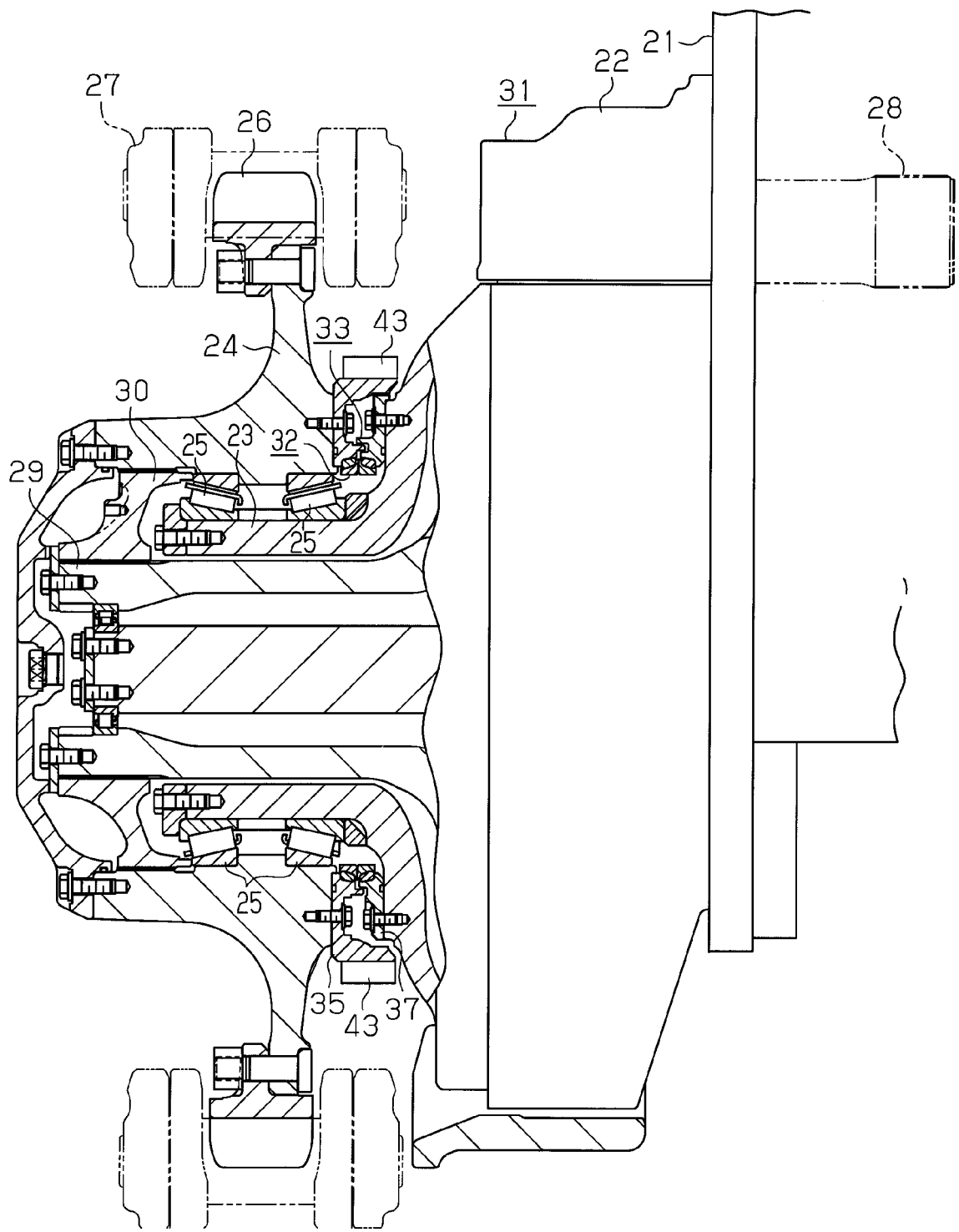
FIG. 1 is a partial cross-sectional view showing a rotating wheel mechanism of a construction machine according to a first embodiment.
Figure 4:
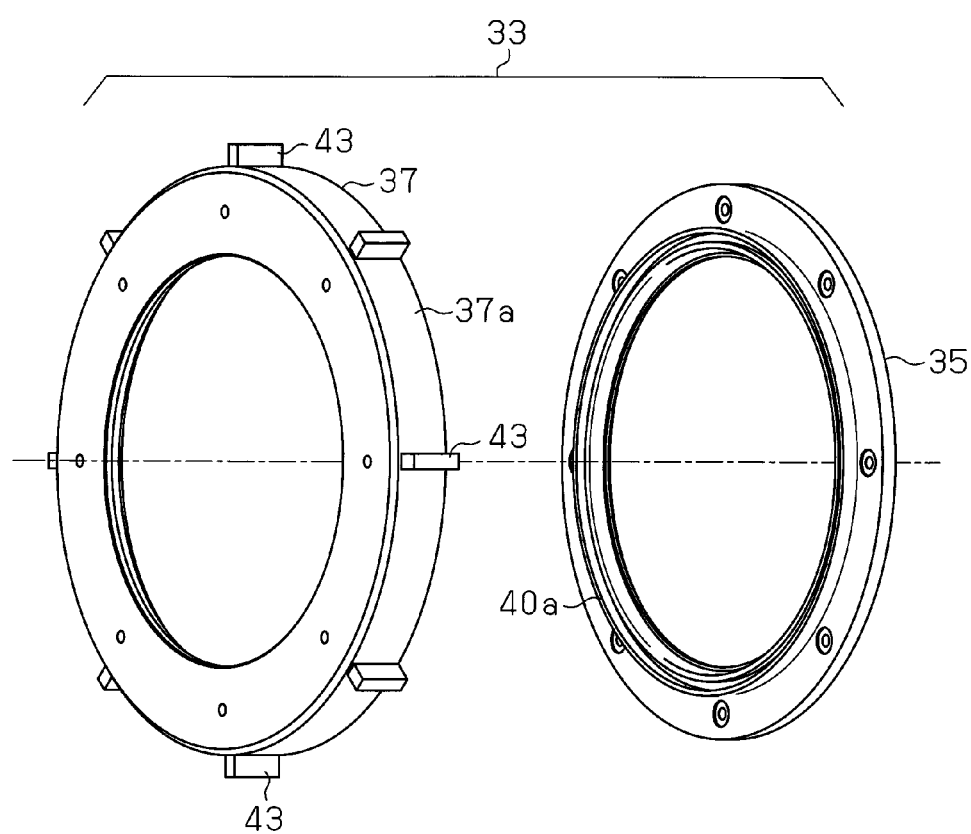
FIG. 4 is an exploded perspective view showing a fixed seal member and a rotating seal member.
Figure 5:
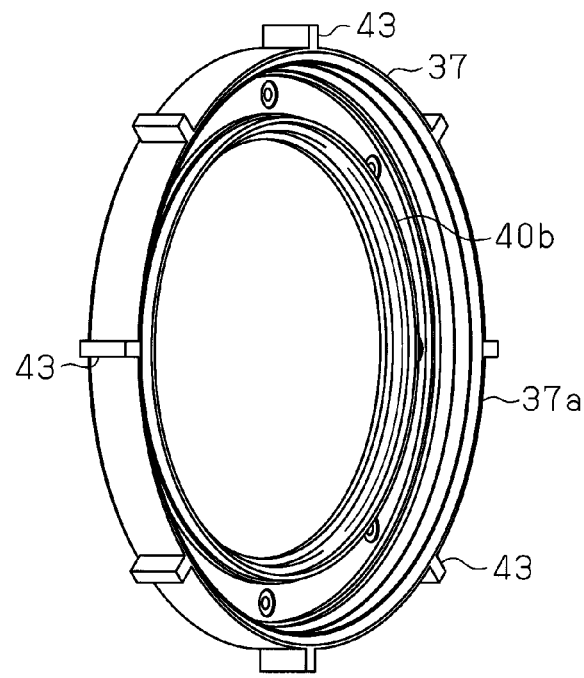
FIG. 5 is a perspective view showing the rotating seal member.
Figure 6:
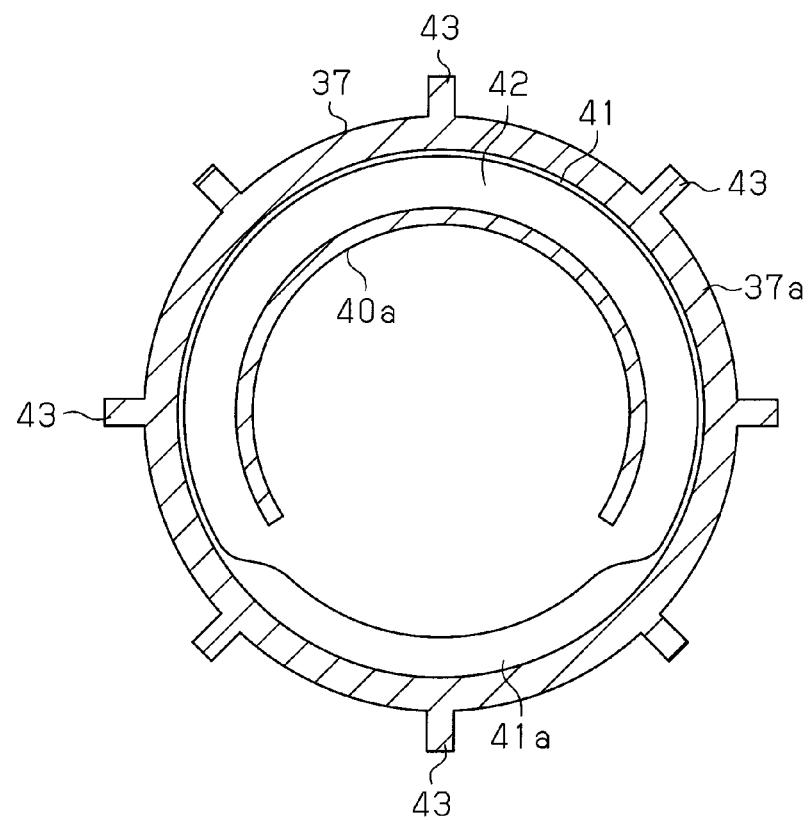
FIG. 6 is a schematic cross-sectional view showing an annular space.

As shown in FIG. 1, in the construction machine, a fixed housing 22 serving as a vehicle body is attached to and fixed at the lower frame 21 of the vehicle body. A drive shaft 28 is rotatably supported on the fixed housing 22, and the drive shaft 28 is rotated forward or in reverse by a hydraulic motor (not illustrated). A cylindrical rotary shaft 29 is rotatably supported in the fixed housing 22, and a drive wheel 24 is rotatably supported with a bearing 25 at a distal end of the fixed housing 22. The drive wheel 24 is coupled to an end of the rotary shaft 29 with a bracket 30.

The rotary shaft 29 is rotated forward or in reverse with its speed reduced through a reduction gear mechanism (not illustrated) in the fixed housing 22 as the drive shaft 28 rotates when the hydraulic motor (not illustrated) is driven. The drive wheel 24 is rotated at a reduced speed. Therefore, a track 27 is caused to go around forward or in reverse in the circumferential direction on a sprocket 26 on the outer circumference of the drive wheel 24, wherein the construction machine moves forward or backward.

FIG. 2 is a cross-sectional view showing an upper part of the drive wheel mechanism, and FIG. 3 is a cross-sectional view showing a lower part of the drive wheel mechanism. As shown in both drawings, an annular floating seal 32 is provided coaxially with the drive wheel 24 between side walls that are opposed to each other of the fixed housing 22 and the drive wheel 24. The floating seal 32 prevents oil, which lubricates the bearing 25, etc., from leaking outside the same floating seal 32, and prevents foreign substances such as dirt, dust, etc., from entering the interior of the floating seal 32. An annular outside seal 33 consisting of a gap seal is mounted between side walls that are opposed to each other of the fixed housing 22 and the drive wheel 24 in order to enclose the outer circumference of the floating seal 32. The outside seal 33 prevents dirt from entering the position of the floating seal 32.

Accordingly, hereinafter, a description is given of the floating seal 32, the outside seal 33, and their related structure based on FIGS. 2 to 6.

The outside seal 33 includes an annular fixed seal member 35 and an annular rotating seal member 37. The fixed seal member 35 is fixed on the side wall of the fixed housing 22 by means of a plurality of screws 34. The rotating seal member 37 faces the fixed seal member 35 and is integrally rotatably fixed to the side wall of the drive wheel 24 by means of a plurality of screws 36. A cover portion 37a is formed so as to protrude toward the fixed housing 22 on the outer circumferential edge of the rotating seal member 37, and the outer circumference of the fixed seal member 35 is covered with the cover portion 37a.

The floating seal 32 has a pair of resilient rings 39 formed of rubber, etc., which are respectively attached to the inner end of the fixed seal member 35 and the rotating seal member 37, and is composed of a seal ring 38, made of special cast iron, supported on the respective resilient rings 39. These seal rings 38 are pressed in a direction along which both are brought into contact with each other by pressure by the force of the resilient ring 39, wherein a sealing function is brought about between the seal rings 38.

A bent-shaped first gap 40 serving as a gap seal is formed between the fixed seal member 35 and the rotating seal member 37 on the outer circumference of the floating seal 32. The first gap 40 is formed by projections 40a and 40b of both seal members 35 and 37. The first gap forms the inner circumferential seal portion. The second gap 41 serving as a gap seal is formed between the fixed seal member 35 and the rotating seal member 37, and the second gap composes the outer circumferential seal portion. The second gap 41 is opened toward the side wall of the fixed housing 22. Also, as shown in FIGS. 3 to 6, the second gap 41 is made into an opening 41a in which the lower part in the circumferential area about the center of rotation of the drive wheel 24 is diagonally widened over the angular range equivalent to one-third of almost the entire circumference, and the second gap 41 is opened downward in the opening 41a.

An annular space 42 is formed between the fixed seal member 35 and the rotating seal member 37 between the first gap 40 and the second gap 41. The annular space 42 is opened downward through the opening 41a of the second gap 41 at the lower part of the circumferential area about the center of rotation of the drive wheel 24.

Dirt is prevented from entering the position of the floating seal 32 from above by collaboration action of the second gap 41 and the first gap 40. In addition, dirt that has entered the annular space 42 from the second gap 41 are discharged outside via the opening 41a.

A plurality of blades (eight blades in the present embodiment) that are square plate-shaped as an entirety and are square-shaped as the section thereof are equidistantly formed in the circumferential direction on the outer circumferential surface of the cover portion 37a of the rotating seal member 37. These blades 43 are formed outwardly in the radial direction of the rotary shaft 29, and are formed parallel to the rotary shaft 29. These blades 43 rotate on the outer circumference of the second gap 41 of the outside seal 33 as the drive wheel 24 rotates. Also, dirt adhered to the side wall of the fixed housing 22 is scraped off and removed by the rotating blades 43, and is prevented from being accumulated on the side wall.

Therefore, where the construction machine is used in, for example, a worksite the soil of which is clay, it is possible to prevent dirt, which is clay, from being adhered to and being accumulated on the side wall of the fixed housing 22 on the outer circumference of the second gap 41 of the outside seal 33. Accordingly, concern for accumulated dirt entering the position of the floating seal 32 through the second gap 41 and the first gap 40 of the outside seal 33 is reduced. In addition, since airflows from the center of rotation of the blades 43 toward the outer circumference are brought about by rotations of the blades 43, dirt are prevented from reaching the second gap 41 by the airflows, wherein it is possible to further prevent dirt from entering.

Further, at the lower part area on the outer circumference of the outside seal 33, the blades 43 prevent dirt from being accumulated on the side wall of the fixed housing 22 in the vicinity of the opening 41a of the second gap 41, wherein it is possible to prevent the opening 41a of the second gap 41 from being clogged due to dirt, and the dirt is smoothly discharged from the interior of the annular space 42. Further, dirt in the annular space 42 are sent outwardly along with air by airflows that are brought about by the blades 43 from the center of rotation of the same blades 43 to the outer circumference. In addition, since the rotating seal member 37 is rotated in a state where it covers the outer circumference of the fixed seal member 35, dirt in the annular space 42 is smoothly discharged by the centrifugal force of the rotations. Accordingly, the dirt that slightly enters the interior of the annular space 42 from the second gap 41 is appropriately discharged outside from the opening 41a of the lower part area of the second gap 41.

As described above, in the first embodiment, it is possible to effectively achieve prevention of entry of dirt into the position of the floating seal 32, wherein the service life of the floating seal 32 is lengthened. Additionally, the construction therefor is only to integrally form the blades 43 on the rotating seal member 37, wherein the number of components is not increased, and the structure is simplified.

Second Embodiment

Next, a description is given of a second embodiment, about the points differing from the first embodiment described above. Also, in respective embodiments coming after the second embodiment, a description is given about the construction and actions differing from those of the first embodiment.

Figure 9:
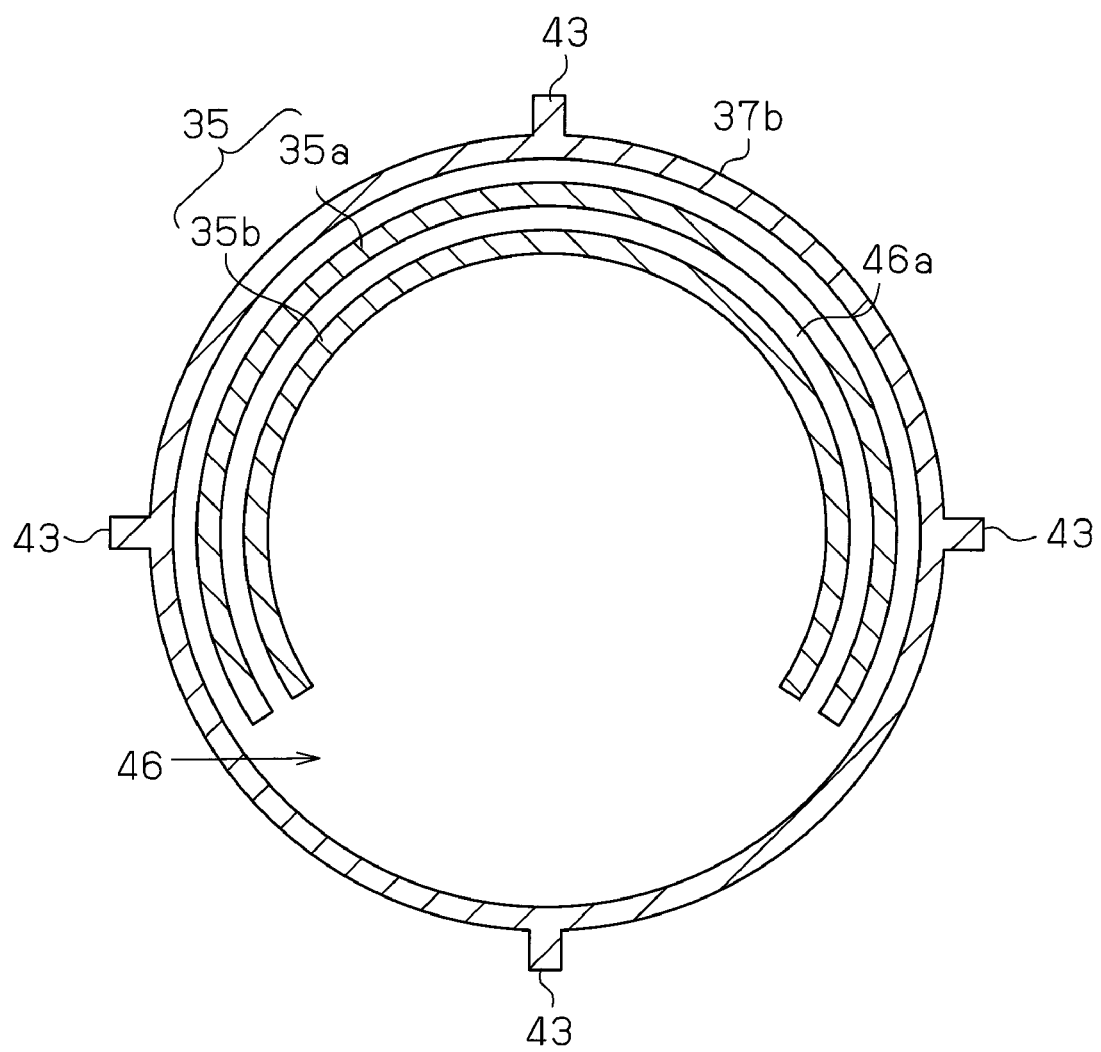
FIG. 9 is a schematic cross-sectional view showing an annular space according to the second embodiment.

In the second embodiment, two lines of projections 35a and 35b are formed on the outer circumference of the fixed seal member 35 of the outside seal 33 at the upper part area of the drive wheel mechanism as shown in FIGS. 7 to 9. An annular recess 46a is formed between the projections 35a and 35b. Also, by increasing the outer diameter of the rotating seal member 37, a diagonal extension portion 37b that encloses the projections 35a, 35b and the recess 46a is formed on the outer circumference of the same rotating seal member 37. The second gap 41 and the third gap 45, which are diagonally shaped, are formed between the projections 35a, 35b and the extension portion 37b. An outer annular space 46 is formed by the recess 46a between the second gap 41 and the third gap 45.

As shown in FIG. 9, the lower part of the fixed seal member 35, including the projections 35a, 35b, is cut off over the angular range equivalent to almost one-third of the entire circumference at the lower part area of the drive wheel mechanism. Therefore, an opening 41a oriented downward is formed at the lower part of the annular space 42.

According to the second embodiment, four blades 43 are provided.

According to the second embodiment, entry of dirt into the position of the floating seal 32 is effectively prevented by a collaboration action of the first through the third gaps 40, 41 and 45, and an action of the outer annular space 46. In addition, since a wide opening 41a is formed at the lower part of the second gap 41 and the third gap 45 by notching the lower part of the fixed seal member 35, dirt that enters the interior of the outer annular space through the third gap 45, and dirt that enters the interior of the annular space 42 through the second gap 41 is appropriately discharged outwardly through the opening 41a.

In particular, in the second embodiment, since the second gap 41 and the third gap 45 are formed on the outer circumference of the fixed sealing member 35, and an outer annular space 46 is formed between the gaps 41 and 45, it is possible to effectively prevent dirt from entering the position of the floating seal 32.

Third Embodiment

Next, a description is given of a third embodiment of the present invention.

In the third embodiment, as shown in FIGS. 10 and 11, the projection 35a of the second embodiment is not formed, but only the projection 35b is formed. Inside blades 43a protrude toward the center of rotations of the drive wheel 24 on the inner circumference of the extension portion 37b of the seal member 37, and the inside blades 43a are positioned in the outer annular space 46 of the fixed seal member 35. Therefore, in the third embodiment, the blades 43 and 43a rotate at two annular areas about the rotation shaft of the drive wheel 24. The first gap 40 is formed of a gap formed by an annular projection 40b protruding in the radial direction of rotation from the rotating seal member 37 and the fixed seal member 35 and a gap formed by a projection 40a protruding in the axial direction of rotation from the fixed seal member 35 and the rotating seal member 37.

Therefore, in the third embodiment, in addition to the operation of the second embodiment, the inside blades 43a discharge dirt located in the outer annular space 46, and prevent dirt from being accumulated on the side wall of the fixed housing 22 in the opening 41a at the lower part. Accordingly, in the third embodiment, it is possible to effectively prevent dirt from entering the floating seal 32 and to effectively discharge the same therefrom.

Fourth Embodiment

Next, a description is given of a fourth embodiment of the present invention.

In the fourth embodiment, as shown in FIGS. 12 to 15, a cover portion 35c is formed so as to protrude toward the drive wheel 24 at the outer circumferential end edge of the fixed seal member 35, and the outer circumference of the fixed seal member 37 is covered with the cover portion 35c. The second gap 41, the third gap 45 and the outer annular space 46 which is not inclined, differing from the second embodiment described above, are formed between the cover portion 35c of the fixed seal member 35 and the outer circumferential surface of the rotating seal member 37. In this case, the third gap 45 is opened toward the side wall of the drive wheel 24. An opening portion 47 is formed over the angular range equivalent to almost one-third of the entire circumference in the lower part area of the cover portion 35c, wherein dirt that enter the interior of the outer annular space 46 through the third gap 45 is discharged outside through the opening portion 47. An annular space 42 and the first gap 40 are formed on the inner circumference of the outer annular space 46, and are continued to each other. Further, the floating seal 32 is disposed further in the space at the inner-circumference of the first gap 40. The first gap 40 consists of an outer circumferential gap existing only in the upper part area of the drive wheel mechanism and an inner circumferential gap existing in the upper part area and the lower part area. The outer circumferential gap is formed of an outer circumference of the projection 40b annularly protruding from the rotating seal member 37 and an inner circumference of the projection 40a annularly protruding from the fixed seal member 35 in the axial direction of rotation. The projection 40a is cut off at a portion equivalent to one-third in the circumferential direction at the lower part area of the drive wheel mechanism.

Figure 14:
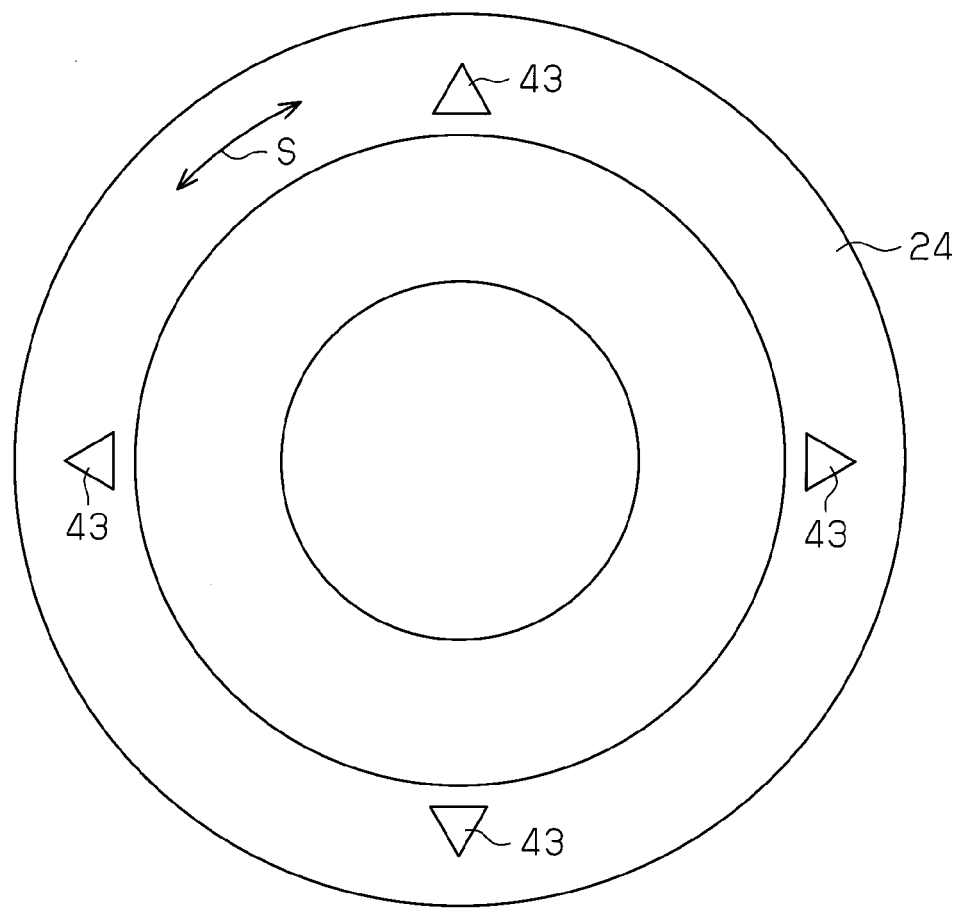
FIG. 14 is a schematic side view showing blades of the rotating wheel mechanism according to the fourth embodiment.
Figure 15:
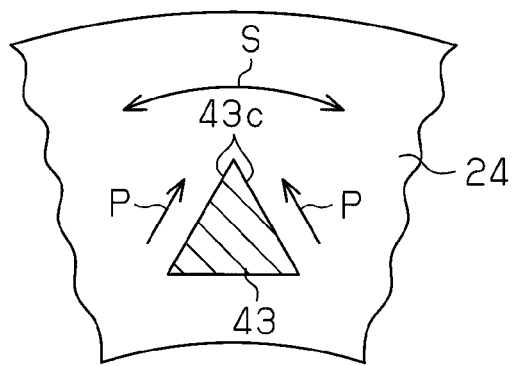
FIG. 15 is a partial cross-sectional view showing a blade of the rotating wheel mechanism according to the fourth embodiment.

Further, as shown in FIGS. 14 and 15, both leading and trailing sides of the drive wheel 24 in the rotation direction (that is, in the direction of arrow S) are made into a diagonal surface 43c at the side wall of the same drive wheel 24 on the outer circumference of the third gap 45, and four blades 43 respectively presenting a triangular shape are formed with their bottom placed at the rotation center so as to protrude from the same outer circumference. When the drive wheel 24 is rotated in the direction of arrow S, the blades 43 are rotated along the outer circumferential area of the third gap 45, wherein dirt adhered to the fixed housing 22 and the fixed seal member 35 is scraped off and removed from the outer circumference of the third gap 45. In this case, the blades 43 have diagonal surfaces 43c formed on both leading and trailing sides, and present a triangular shape in its section. Therefore, even when the drive wheel 24 is rotated either forward or in reverse, dirt that is scraped off and removed by means of the blades 43 by a guiding action of the diagonal surfaces 43c is guided to the outer circumference of the drive wheel 24 along the diagonal surfaces 43c in the direction of arrow P. Further, airflows oriented to the outer circumference along the same diagonal surfaces 43c are formed by actions of the diagonal surfaces 43c. Accordingly, the scraped dirt is effectively discharged outwardly.

Also, in a fourth embodiment, since the outer circumference of the outside seal 33 is composed of a part of the fixed seal member 35, it is possible to effectively prevent dirt from entering the interior of the outside seal 33.

Fifth Embodiment

Next, a description is given of a fifth embodiment of the present invention.

Figure 16:
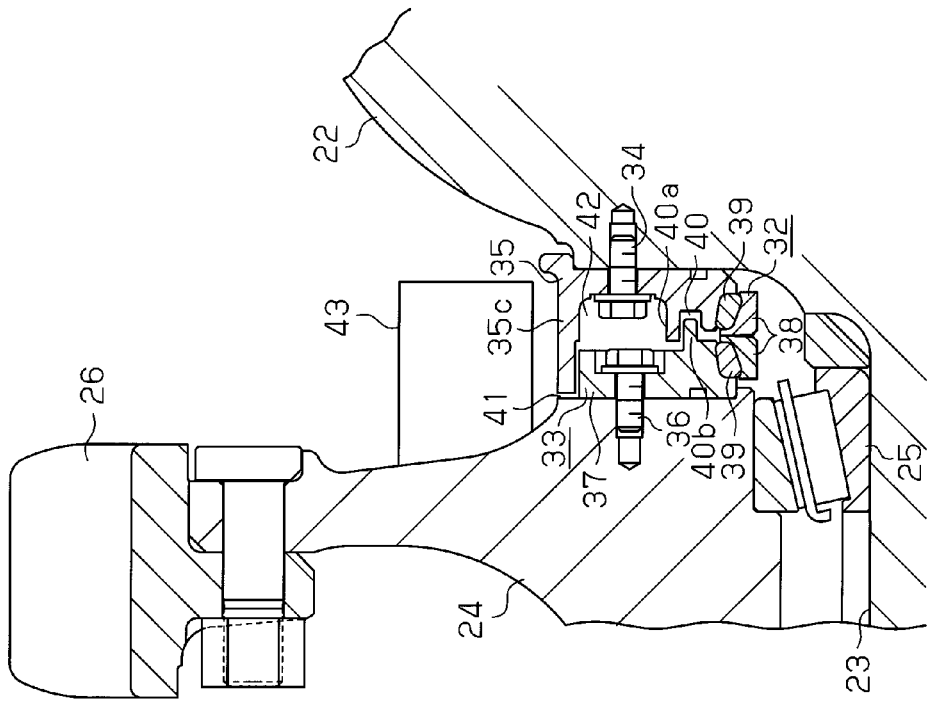
FIG. 16 is a partial cross-sectional view showing a lower sealing structure of a rotating wheel mechanism according to a fifth embodiment.

The fifth embodiment is such that, in the construction of the fourth embodiment described above, a notched portion 35*d* is formed at the cover portion 35*c* at the lower part of the fixed seal member 35, and the lower part of the annular space 46 is greatly opened downward as shown in FIG. 16.

Therefore, in the fifth embodiment, dirt is effectively discharged from the interior of the annular space 42.

Sixth Embodiment

Next, a description is given of a sixth embodiment.

Figure 17:
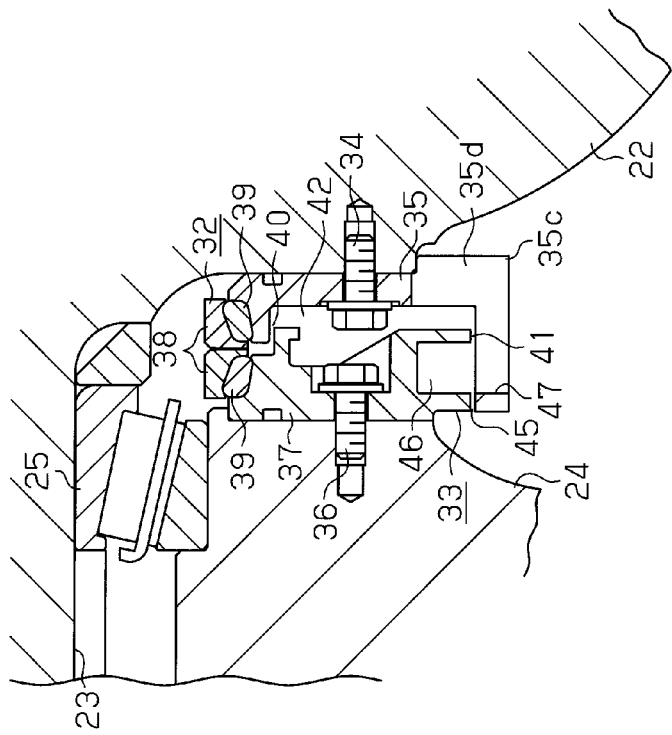
FIG. 17 is a partial cross-sectional view showing an upper sealing structure of a rotating wheel mechanism according to a sixth embodiment.
Figure 18:
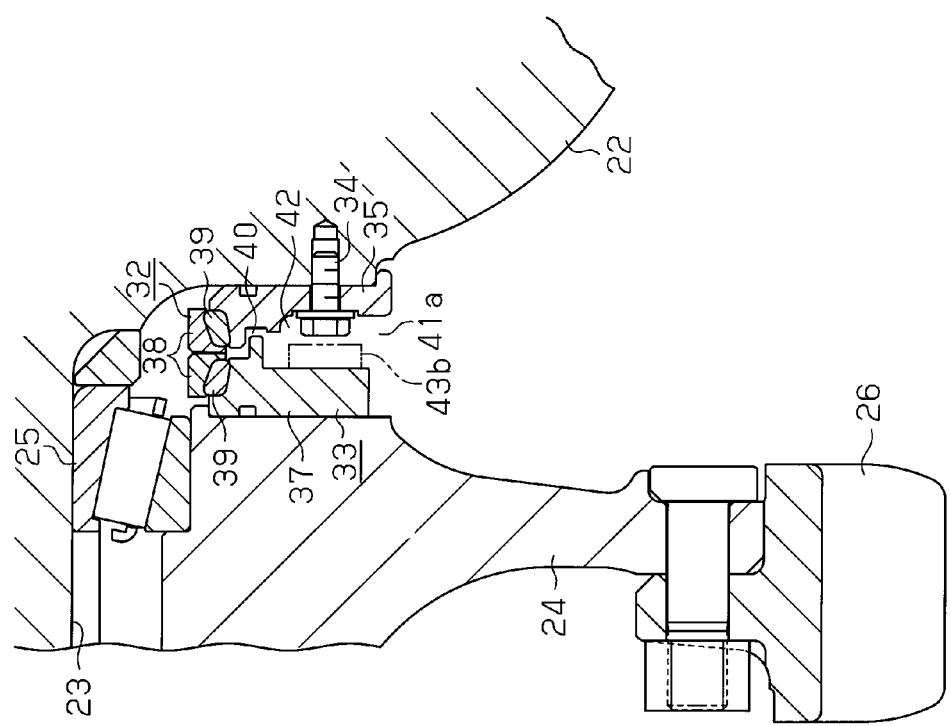
FIG. 18 is a partial cross-sectional view showing the lower sealing structure of the rotating wheel mechanism according to the sixth embodiment.
Figure 19:
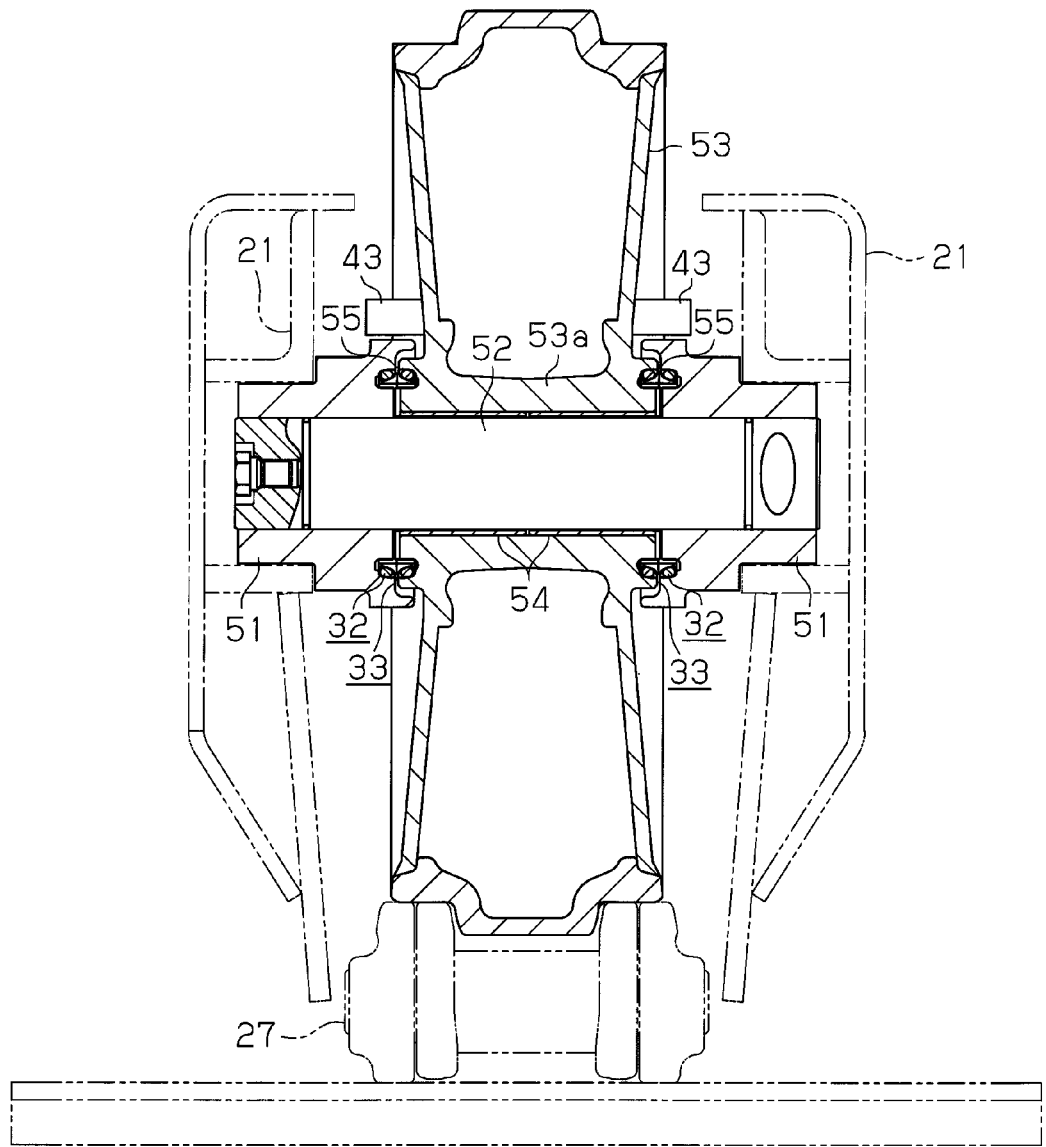
FIG. 19 is a partial cross-sectional view showing a rotating wheel mechanism of a construction machine according to a seventh embodiment.
Figure 20:
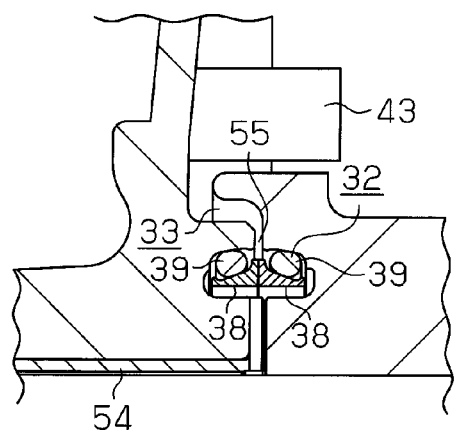
FIG. 20 is a partial cross-sectional view showing an upper portion of the sealing structure of FIG. 19.
Figure 21:
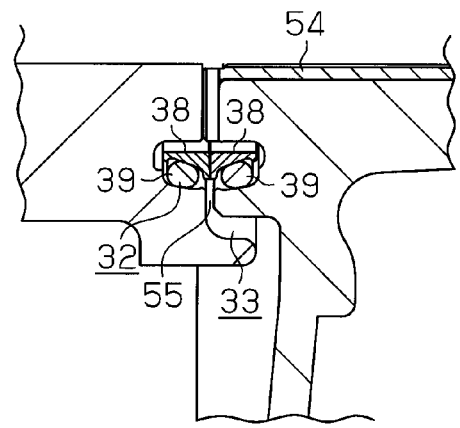
FIG. 21 is a partial cross-sectional view showing a lower portion of the sealing structure of FIG. 19.
Figure 22:
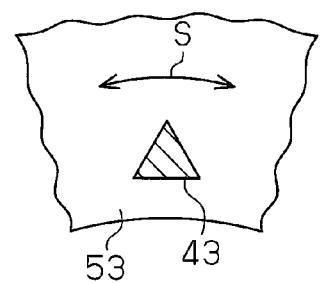
FIG. 22 is a schematic cross-sectional view showing blades of the rotating wheel mechanism according to the seventh embodiment.

In the sixth embodiment, as shown in FIGS. 17 and 18, a cover portion 35*c* that covers the outer circumference of the rotating seal member 37 is formed at the outer circumferential end edge of the fixed seal member 35 so as to protrude therefrom as in the fourth and fifth embodiments described above. The second gap 41 is formed between the distal end of the cover portion 35*c* of the fixed seal member 35 and the side wall of the drive wheel 24. Also an annular space 42 is formed inside the second gap 41. An opening 41*a* is formed over the angular range equivalent to almost one-third of the entire circumference at the lower part area of the second gap 41. The lower part of the annular space 42 is opened downward by the opening 41*a*, wherein dirt that enters the interior of the annular space 42 through the second gap 41 is discharged outside through the opening 41*a*.

On the outer circumference of the second space 41, the blades 43 the section of which is a triangle shape is formed at the side of the rotating seal member 37 so as to protrude therefrom at the outer circumference of the second gap 41 as in the fourth and fifth embodiments described above.

Therefore, in the sixth embodiment, advantages equivalent to those of the fourth and fifth embodiments are obtained in sixth embodiment.

Seventh Embodiment

Next, a description is given of a seventh embodiment in which the present invention is embodied in an idler tumbler mechanism of crawler track traveling equipment with reference to FIGS. 19 to 22.

In the seventh embodiment, a pair of shaft supporting members 51 are disposed at the lower frame 21, which serves as the vehicle body of a construction machine, with an interval. A support shaft 52 is suspended between the axle supporting members 51. An idler tumbler 53 serving as a rotating wheel is rotatably attached to and supported at the support shaft 52 between the shaft supporting members 51 with a sleeve 54 at the central cylindrical portion 53*a* of the idler tumbler 53, and a continuous track 27 is engaged with the outer circumference of the idler tumbler 53. A floating seal 32 consisting of a resilient ring 39 and a seal ring 38 is applied between both ends of the cylindrical portion 53*a* of the idler tumbler 53 and the respective shaft supporting member 51. An outside seal 33 is disposed between both ends of the cylindrical portion 53*a* of the idler tumbler 53 and the respective shaft supporting members 51 so as to enclose the outer circumference of the floating seal 32. In the seventh embodiment, the outside seal 33 is composed of a gap seal having a gap 55.

The blades 43, the section of which is a triangular shape and the bottom of which is disposed at the center of rotation of the idler tumbler 53, are formed at both side walls of the idler tumbler 53 so as to protrude therefrom, so that the blades 43 are positioned at the outer circumference of the outside seals 33. When the idler tumbler 53 is rotated in the direction of arrow S as continuous track 27 rotates, these blades 43 are rotated along the outer circumference of the gap 55 of the outside seal 33, and dirt that adheres to shaft supporting members 51 is scraped off.

Therefore, in the seventh embodiment, dirt is prevented from being accumulated at the outer circumference of the outside seal 33, wherein it is possible to obtain the protective effects of the floating seal 32 which is almost similar to the effects described in the respective embodiments described above.

Eighth Embodiment

Figure 23:
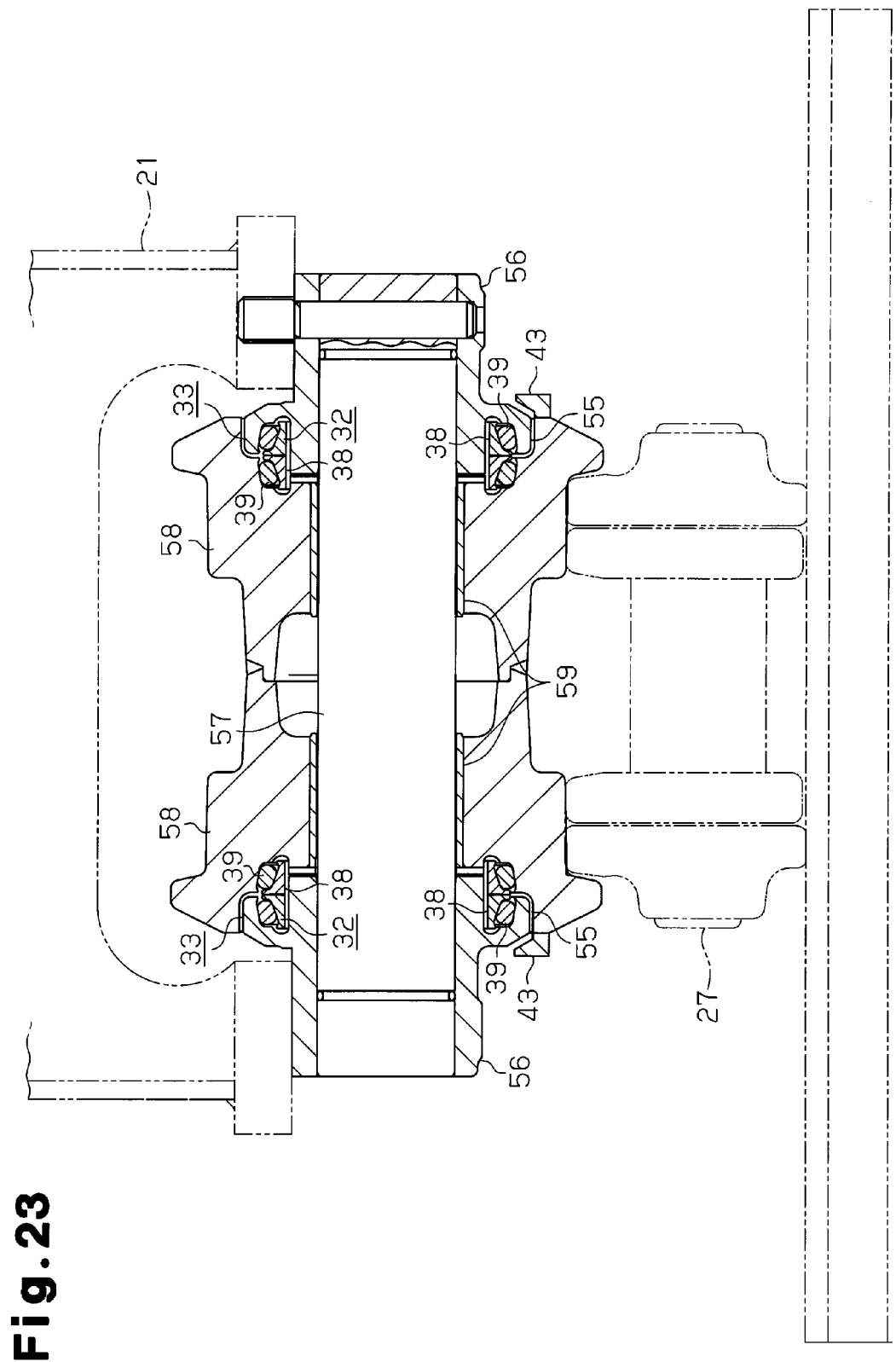
FIG. 23 is a partial cross-sectional view showing a rotating wheel mechanism of a construction machine according to an eighth embodiment.
Figure 24:
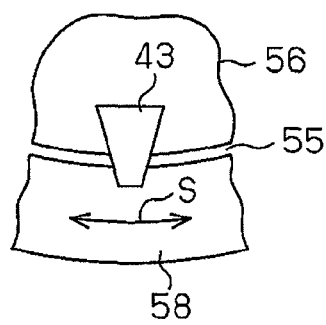
FIG. 24 is a schematic cross-sectional view showing blades of the rotating wheel mechanism of the construction machine according to the eighth embodiment.
Figure 25:
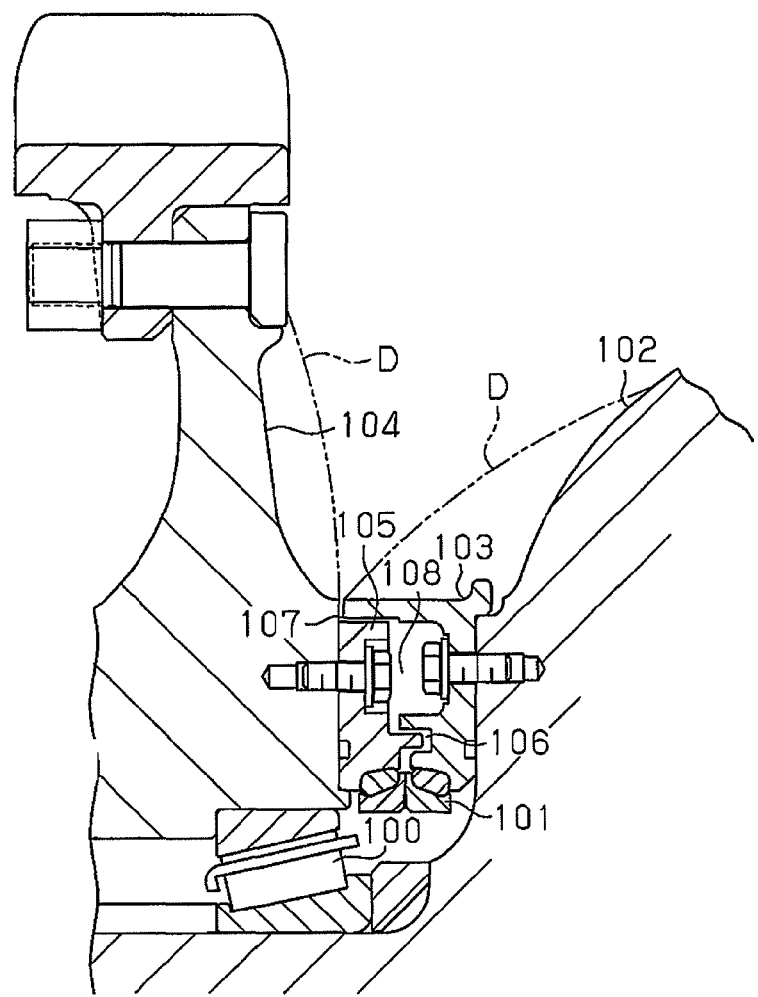
FIG. 25 is a partial cross-sectional view showing an upper sealing structure of a prior art rotating wheel mechanism.
Figure 26:
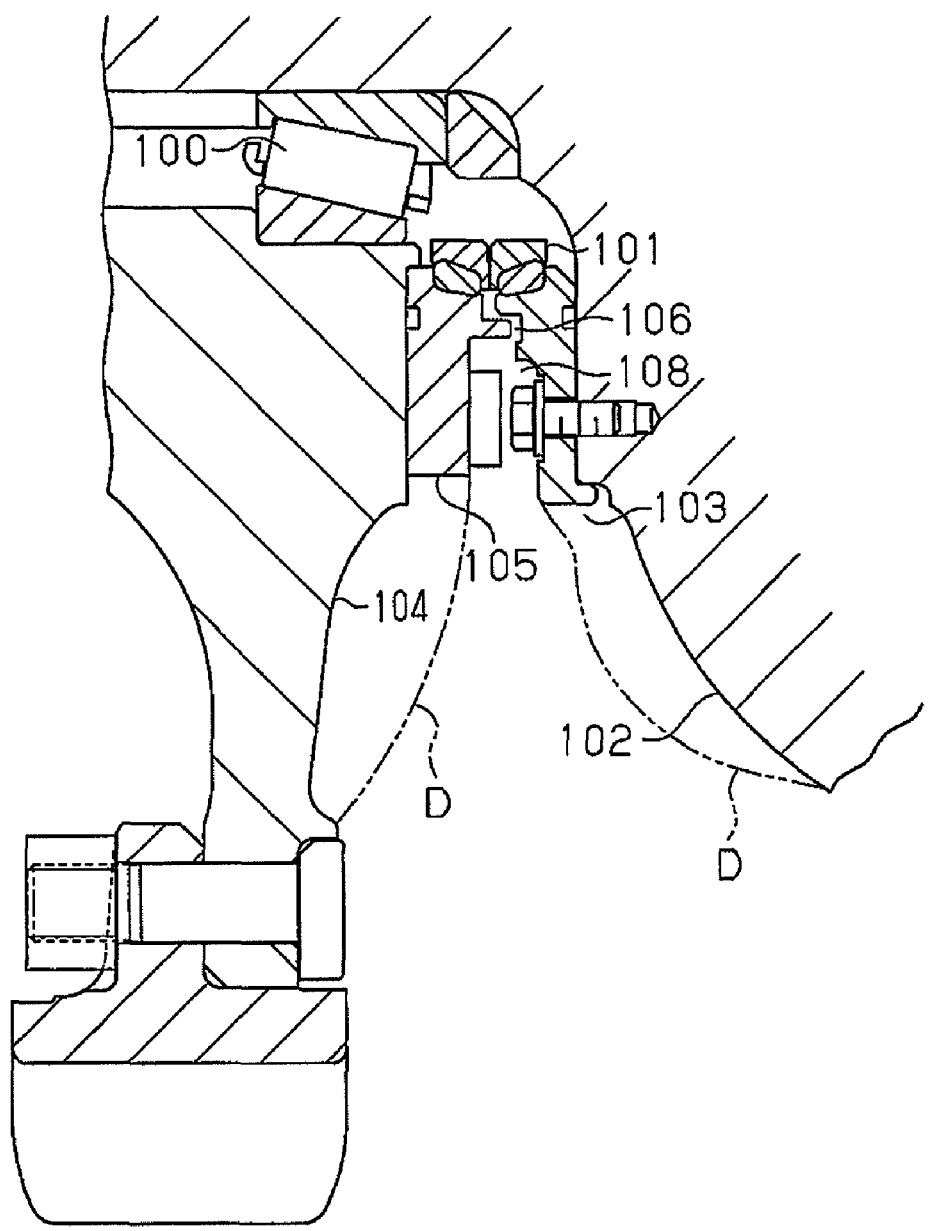
FIG. 26 is a partial cross-sectional view showing a lower sealing structure of the prior art rotating wheel mechanism.

Next, a description is given of an eighth embodiment, in which the present invention is embodied in a roller mechanism of a construction machine such as a bulldozer, etc., with reference to FIGS. 23 and 24.

In the eighth embodiment, a pair of shaft supporting members 56 are disposed so as to be opposed to each other at the lower frame 21 serving as the vehicle body of a construction machine, and a supporting shaft 57 is applied between the shaft supporting members 56. Rollers 58 serving as rotating wheels are rotatably attached to and supported at the supporting shaft 57 by means of a sleeve 59, and these rollers 58 receive the inner circumference of the continuous track 27 on the outer circumference thereof. A floating seal 32 consisting of a resilient ring 39 and a seal ring 38 is disposed between the respective rollers 58 and the shaft supporting member 56. An outside seal 33 consisting of a gap seal is disposed between the respective rollers 58 and the shaft supporting member 56 so as to cover the outer circumference of the floating seal 32.

Blades 43, the section of which is a triangular shape and the bottom of which is disposed at the center of the supporting shaft 57, are formed on the outside surface of the rollers 58 so as to protrude therefrom, so that the blades are positioned at the outer circumference of the gap 55 of both the outside seals 33. When the roller 58 is rotated as the track 27 rotates, these blades 43 are rotated along the outer circumference of the gap 55 of the outside seal 33, wherein dirt that are adhered to the shaft supporting member 56 are scraped off and removed.

Therefore, in the eighth embodiment, advantages almost similar to those of the seventh embodiment are obtained.

MODIFICATIONS

The embodiments may be modified as follows. That is, in the sixth embodiment, as shown by double dotted chain lines in FIG. 18, blades 43*b* may be formed on a side of the rotating seal member 37 of the outside seal 33, or the blades the section of which is a triangular shape in the fourth embodiment shown in FIG. 12 may be made square-shaped in the section. In addition, in the first and second embodiments, blades may be provided on sides of the drive wheel 24. That is, the blades 43 may be provided on both of the rotating seal member 37 and the drive wheel 24. Further, in the first and second embodiments, the blades 43 may be formed to be a triangular shape in the sections thereof almost as in third embodiment. In the respective embodiments described above, the number of the blades 43, 43*a* and 43*b* may be optionally changed. As long as one blade is provided, the number of the blades 43, 43*a* and 43*b* may be two, three, six or more.

The invention claimed is:

1. A rotating wheel mechanism of a construction machine located between a vehicle body and a rotating wheel, comprising an annular seal secured coaxially with the rotating wheel and an outside seal, which covers the outer circumference of the annular seal, wherein blades that rotate in an outer circumferential area of the outside seal are provided on the rotating wheel or a portion rotating integrally with the rotating wheel, and wherein the blades include a first blade protruding toward the outer circumference of the rotating wheel, and a second blade protruding toward the center of rotation of the rotating wheel on the inner circumference of the first blade.

2. The rotating wheel mechanism of a construction machine according to claim 1, wherein the outside seal is a gap seal composed of a gap between a fixed seal member secured to the vehicle body and a rotating seal member secured to the rotating wheel, and the gap seal coaxially includes an inner circumferential seal and an outer circumferential seal, wherein the outer circumferential seal is opened downward at a lower part of a circumferential area the center of which coincides with the rotation center of the rotating wheel.

3. The rotating wheel mechanism of a construction machine according to claim 2, wherein the rotating seal member is positioned on the outer circumference of the fixed seal member in the outer circumferential seal portion, and the blades are provided on the rotating seal member.

4. The rotating wheel mechanism of a construction machine according to claim 2, wherein an annular space opened downward at a lower part of the circumferential area about the center of rotation of the rotating wheel is formed between the outer circumferential seal and the inner circumferential seal.

5. The rotating wheel mechanism of a construction machine according to claim 1, wherein the blades include a diagonal surface to discharge dirt from the center of rotation of the rotating wheel to the outside thereof as the rotating wheel rotates.

6. The rotating wheel mechanism of a construction machine according to claim 5, wherein the diagonal surface of the blade is provided on a leading side and a trailing side in the rotation direction of the rotating wheel.

7. The rotating wheel mechanism of a construction machine according to claim 1, wherein the rotating wheel mechanism is a drive wheel mechanism.

* * * * *